United States Patent
Tu et al.

(10) Patent No.: US 7,325,231 B2
(45) Date of Patent: Jan. 29, 2008

(54) METHOD AND RELATED DEVICE FOR UPDATING FIRMWARE CODE STORED IN NON-VOLATILE MEMORY

(75) Inventors: Li-Chun Tu, Taipei (TW); Ping-Sheng Chen, Chia-Yi Hsien (TW); Yi-Chuan Chen, Taipei (TW); Sung-Yang Wu, Tai-Chung Hsien (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 262 days.

(21) Appl. No.: 10/906,298

(22) Filed: Feb. 14, 2005

(65) Prior Publication Data

US 2005/0229172 A1    Oct. 13, 2005

(30) Foreign Application Priority Data

Apr. 9, 2004    (TW) .............................. 93109953 A (51) Int. Cl.
G06F 13/12    (2006.01)
(52) U.S. Cl. .................... 717/168; 711/159; 711/103; 710/305; 365/185.33
(58) Field of Classification Search ................ None
See application file for complete search history.

(56) References Cited

U.S. PATENT DOCUMENTS 5,835,936 A * 11/1998 Tomioka et al. ............ 711/103
6,009,497 A * 12/1999 Wells et al. ................. 711/103
6,170,043 B1 * 1/2001 Hu .............................. 711/158
6,507,881 B1    1/2003 Chen
6,523,083 B1    2/2003 Lin et al.

OTHER PUBLICATIONS

Drevensek et al., "PC Supported Motor Drive Controller", Proceedings of the IEEE Symposium on Industrial Electronics, 1999, IEEE, vol. 2, pp. 647-650.*

* cited by examiner

Primary Examiner—B. James Peikari
(74) Attorney, Agent, or Firm—Winston Hsu (57) ABSTRACT

A non-volatile memory is installed in an electronic device. A method for updating a firmware code stored in a non-volatile memory includes: providing an updating control unit having a command set; providing the updating control unit with a trigger signal to enable at least one command of the command set; and utilizing the updating control unit to read/write the non-volatile memory according to the enabled command to update the firmware code. Wherein each command of the command set is a memory read/write command. The method further includes updating at least one command of the command set in real time. The present invention further provides an electronic device corresponding to the method.

26 Claims, 7 Drawing Sheets

METHOD AND RELATED DEVICE FOR UPDATING FIRMWARE CODE STORED IN NON-VOLATILE MEMORY

BACKGROUND

The present invention relates to a method and related device for updating firmware code stored in a non-volatile memory.

Figure 1:
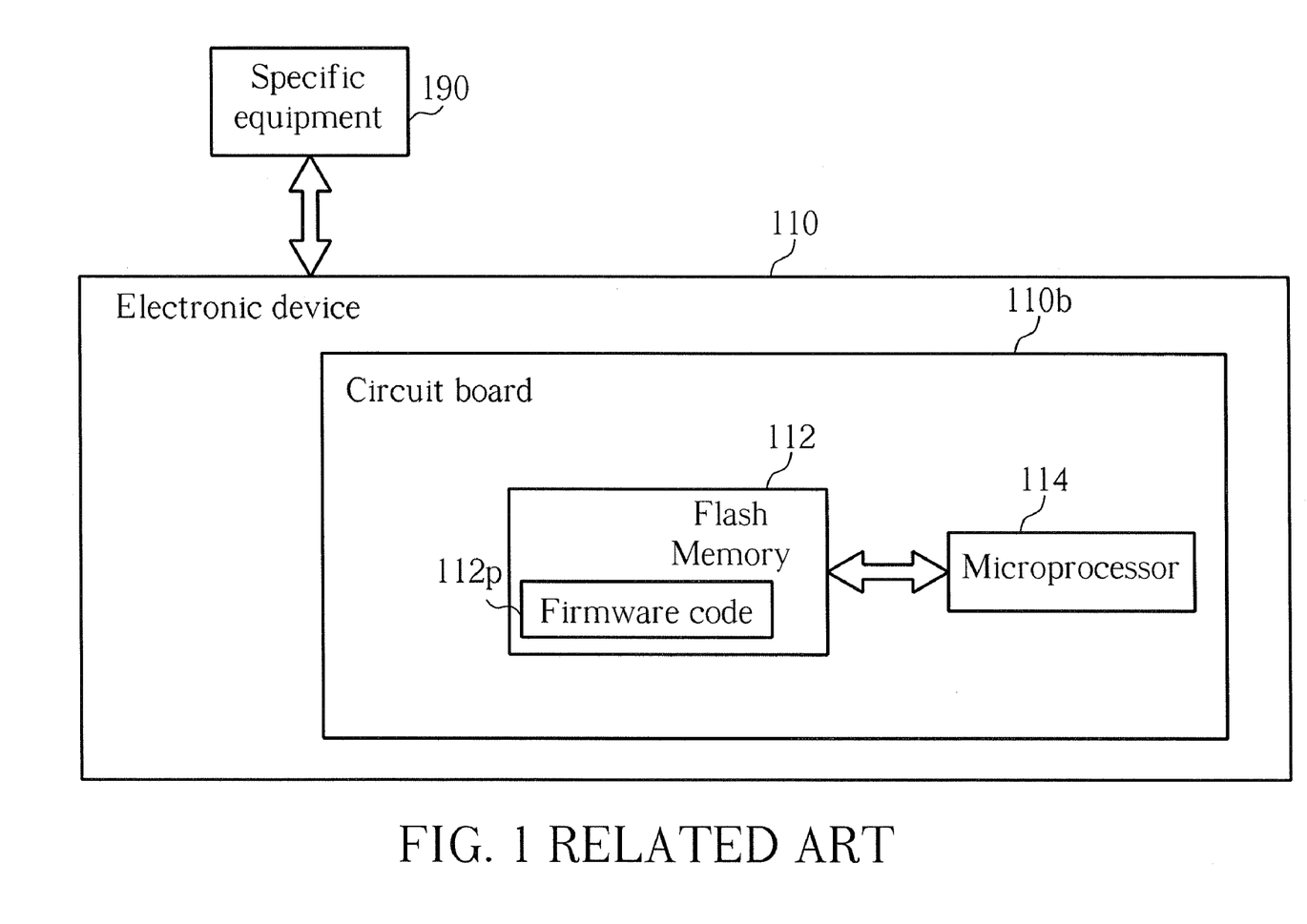
FIG. 1 is a block diagram of an electronic device and a firmware code updating device according to the related art.

As consumer electronic products are developed with great diversity of functionality, the architecture shown in FIG. 1 has become very popular. As shown in FIG. 1, an electronic device 110 includes a non-volatile memory 112 for storing firmware code 112p, which is a program 112p used for controlling the functionality of the electronic device 110. The electronic device 110 further includes a microprocessor 114 for executing the program 112p read from the non-volatile memory 112. The non-volatile memory 112 mentioned above is usually a Flash Memory (Flash ROM). The program 112p is stored in the Flash Memory using a format of the firmware code 112p.

Figure 2:
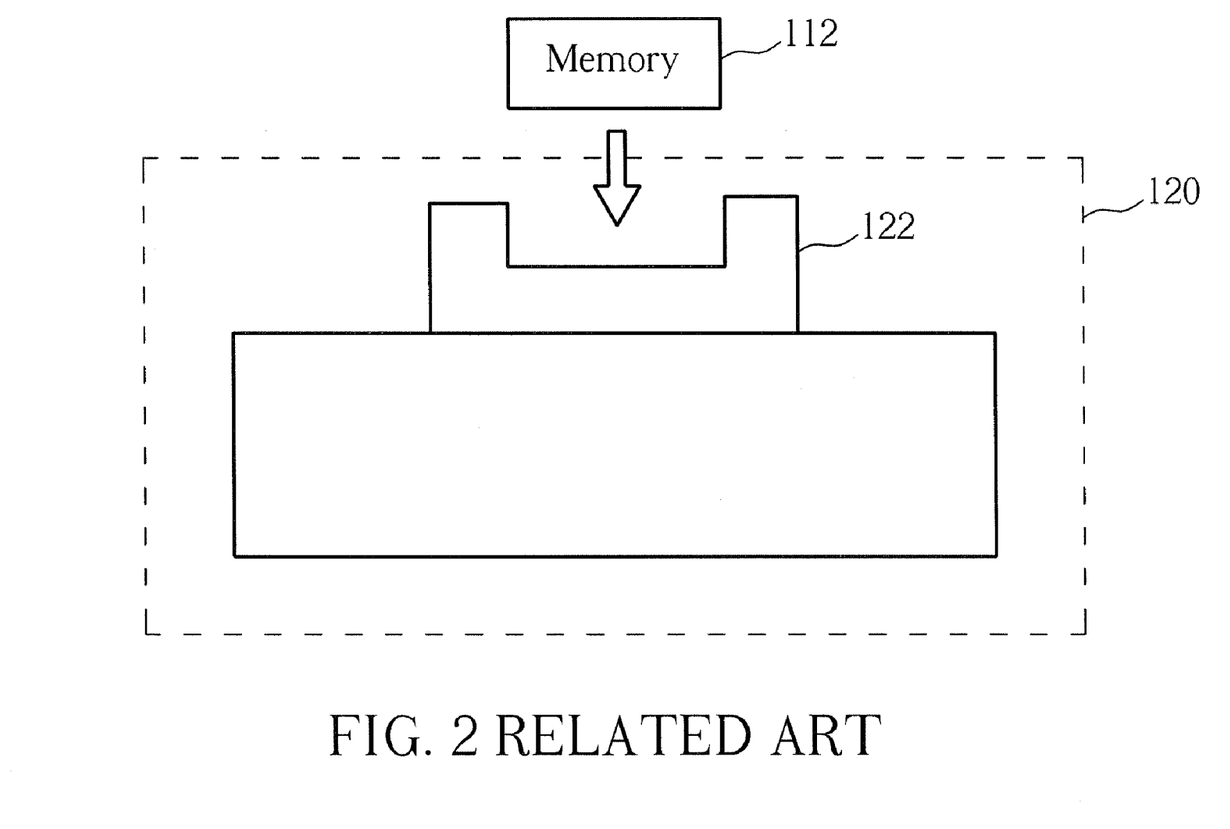
FIG. 2 is a diagram of a firmware code updating device according to the related art.

As shown in FIG. 2, a process of updating the firmware code 112p stored in the non-volatile memory 112 using a ROM writer 120 is well known in the art. Firstly, put the memory 112 into a holder 122 of the ROM writer 120 to write the firmware code 112p into the memory 112, and secondly install the memory 112 on a circuit board 110b of the electronic device 110 shown in FIG. 1 so that the firmware for controlling the electronic device 110 is accessible by the microprocessor 14. For an end user, uninstalling or installing the memory 112 from or to the circuit board 110b is not easy since the memory 112 is usually soldered onto the circuit board 110b. In addition, the ROM writer 120 is not convenient for end users. Therefore, updating the firmware code 112p is very difficult for the end user.

Another process of updating the firmware code 112p stored in the memory 112 involves electrically connecting specific equipment 190 to the electronic device 110 to directly control voltage levels of each pin of the memory 112. Please refer to U.S. Pat. No. 6,507,881 for related information. However, according to this related art technique, the electrical connection between the electronic device 110 and the specific equipment 190 should be constantly maintained while updating the firmware code 112p. Furthermore, a large number of pieces of specific equipment are required for updating the firmware code 112p if a large number of electronic devices need to be revised by updating the firmware code 112p. Therefore, this leads to a trade-off between the high cost of the large number of pieces of specific equipment and the efficiency of updating the firmware code 112p of the large number of electronic devices.

SUMMARY

The present invention provides a method for updating a firmware code stored in a non-volatile memory. The non-volatile memory is installed in an electronic device. The method includes: within the electronic device, providing an updating control unit having a command set; providing the updating control unit with a trigger signal to enable at least one command of the command set; and utilizing the updating control unit to read/write the non-volatile memory according to the enabled command to update the firmware code. Wherein each command of the command set is a memory read/write command. The method further includes updating at least one command of the command set in real time.

The present invention further provides an electronic device capable of updating a firmware code stored in a non-volatile memory. The firmware code is used for controlling the electronic device. The electronic device includes an updating control unit electrically connected to the non-volatile memory for updating the firmware code. The updating control unit further includes a command set. When triggered by a trigger signal, the updating control unit is capable of reading/writing the non-volatile memory according to the command set to update the firmware code. Wherein the command set includes at least one command, and each command of the command set is a memory read/write command. In addition, each command of the command set is capable of being updated in real time.

It is an advantage of the present invention that during the process of updating the firmware code, it is unnecessary to uninstall or install the non-volatile memory from or to a circuit board of the electronic device. In addition, according to the present invention, it is unnecessary to prepare a ROM writer for updating the firmware code. When triggered by the trigger signal, the electronic device starts to update the firmware code. Therefore, updating the firmware code according to the present invention is more convenient.

It is another advantage of the present invention that each command of the command set of the updating control unit is a memory read/write command that is handy for the electronic device to update the firmware code. Therefore, the efficiency of updating the firmware code of a large number of electronic devices is improved. In addition, as each command of the command set is capable of being updated in real time, the present invention method and device are flexible.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
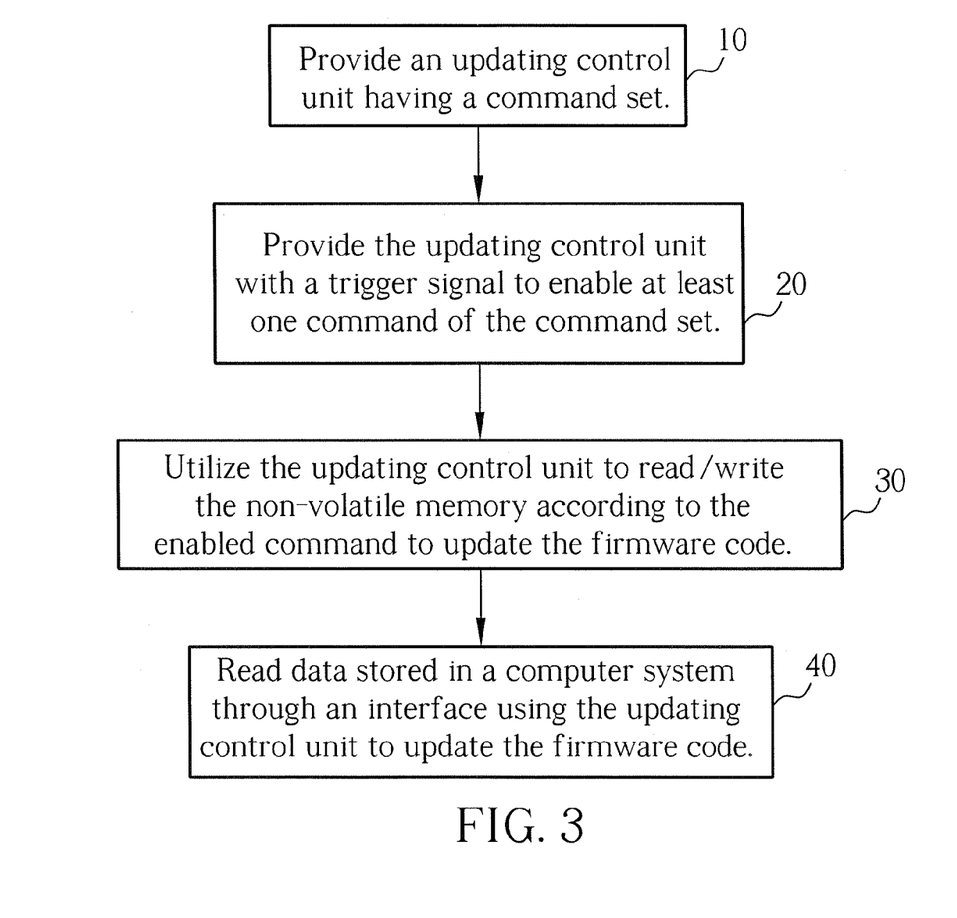
FIG. 3 is a flowchart of a method for updating a firmware code stored in a non-volatile memory according to the present invention.
Figure 4:
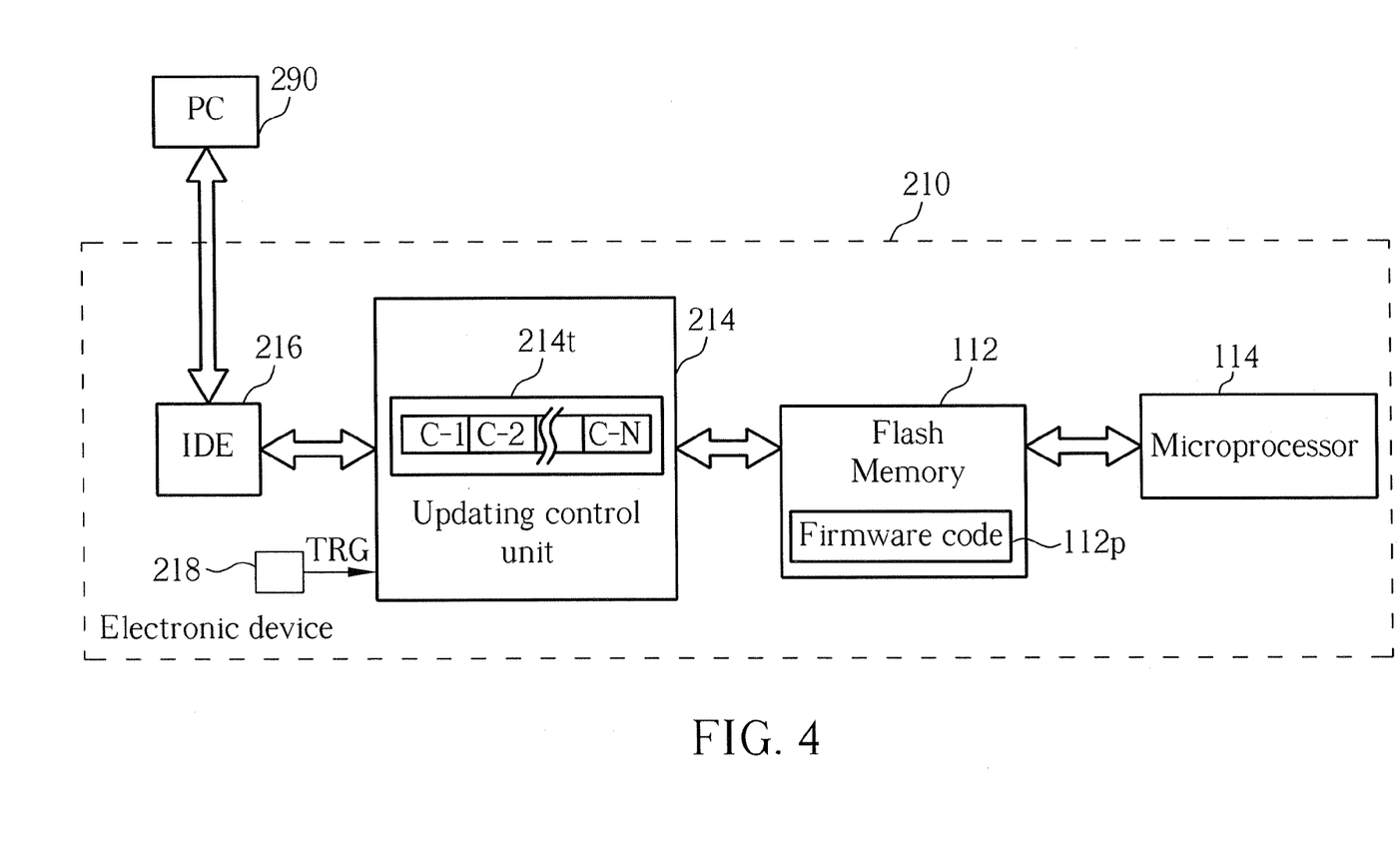
FIG. 4 is a diagram of an electronic device according to a first embodiment of the present invention.

Please refer to FIG. 3 and FIG. 4 at the same time. FIG. 3 is a flowchart of a method for updating a firmware code 112p stored in a non-volatile memory 112 according to the present invention. FIG. 4 is a diagram of an electronic device 210 according to a first embodiment of the present invention. In this embodiment, the non-volatile memory 112 is a Flash Memory. The electronic device 210 includes the Flash Memory and the microprocessor 114 both well known in the art, wherein the Flash Memory stores the firmware code 112$p$. The electronic device 210 further includes an Integrated Device Electronics (IDE) interface 216 capable of being electrically connected to a computer system 290 shown in FIG. 4. In the first embodiment, the electronic device 210 is an optical storage device such as an optical disc drive. The present invention method is described as follows, however, the order of the steps is not a limitation of the present invention.

Step 10: Within the electronic device 210, provide an updating control unit 214 having a command set C-1, C-2, ..., C-N, wherein each command C-I (I=1, 2, ..., N) of the command set C-1, C-2, ..., C-N is a memory read/write command. In the present embodiment, each command of the command set C-1, C-2, ..., C-N is of a fixed format and installed in the updating control unit 214 using a lookup table 214$t$.

Step 20: Provide the updating control unit 214 with a trigger signal TRG to enable at least one command C-J (J=1, 2, ..., or N) of the command set C-1, C-2, ..., C-N. In the present embodiment, the trigger signal TRG is generated by a specific button 218 of the electronic device 210 and transmitted to the updating control unit 214 to enable the command C-J.

Step 30: Utilize the updating control unit 214 to read/write the memory 112 according to the enabled command C-J to update the firmware code 112$p$.

Step 40: Read data stored in the computer system 290 through the IDE interface 216 using the updating control unit 214 to update the firmware code 112$p$.

In the present embodiment, the computer system 290 is considered to be a database. In step 40, the electronic device 210 reads the data stored in the database using the updating control unit 214 to update the firmware code 112$p$. That is, when updating the firmware code 112$p$, the master control device is the electronic device 210 rather than the computer system 290.

Figure 5:
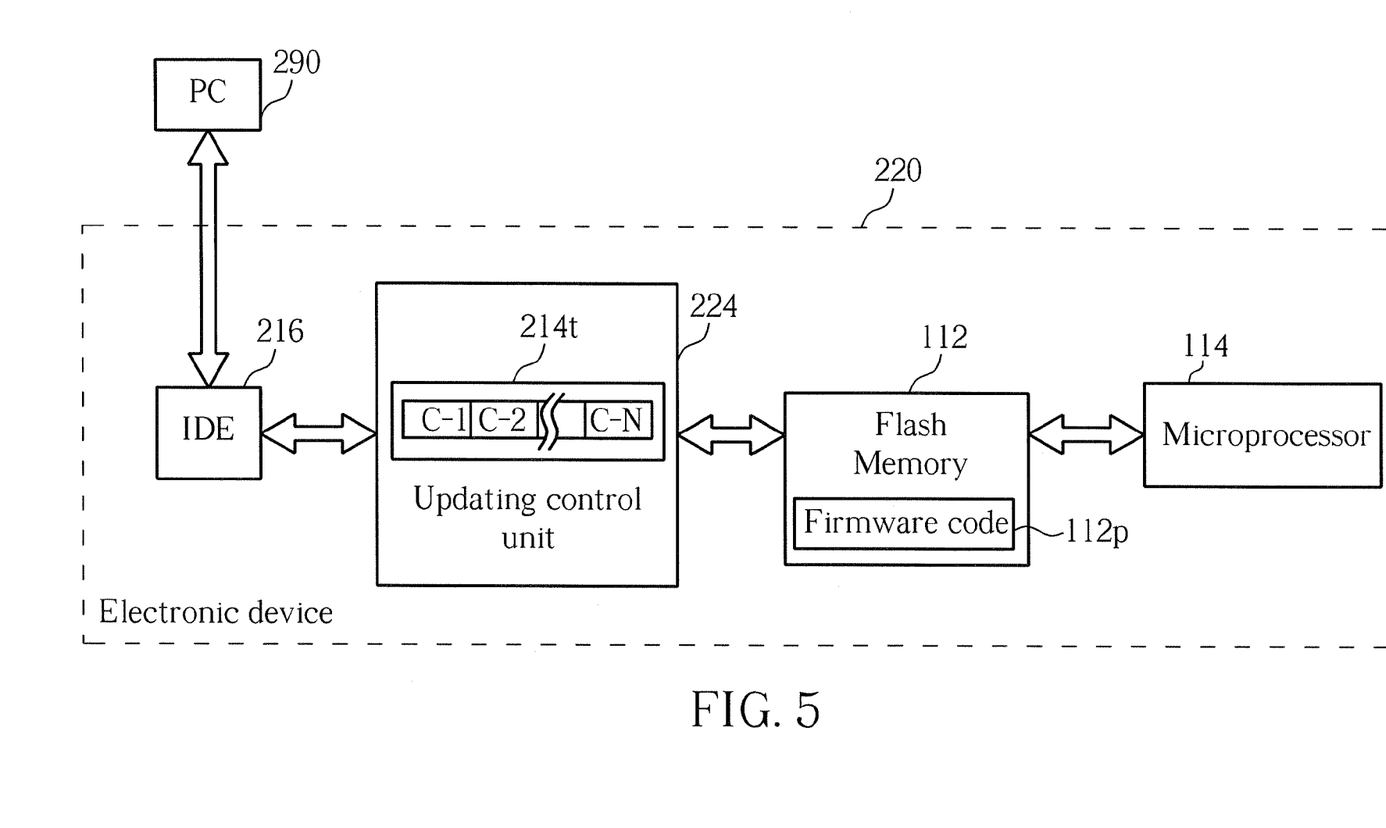
FIG. 5 is a diagram of an electronic device according to a second embodiment of the present invention.

A second embodiment of the present invention is similar to the first embodiment mentioned above with exceptions described as follows. According to the second embodiment shown in FIG. 5, when updating the firmware code 112$p$, the master control device is the computer system 290. The trigger signal TRG is generated by the computer system 290 and transmitted through the interface 216 to the updating control unit 224 to enable the command C-J. When the computer system 290 outputs data, the electronic device 220 is capable of receiving the data. Therefore, according to the second embodiment, the updating control unit 224 reads the data outputted by the computer system 290 through the interface 216 to update the firmware code 112$p$.

Figure 6:
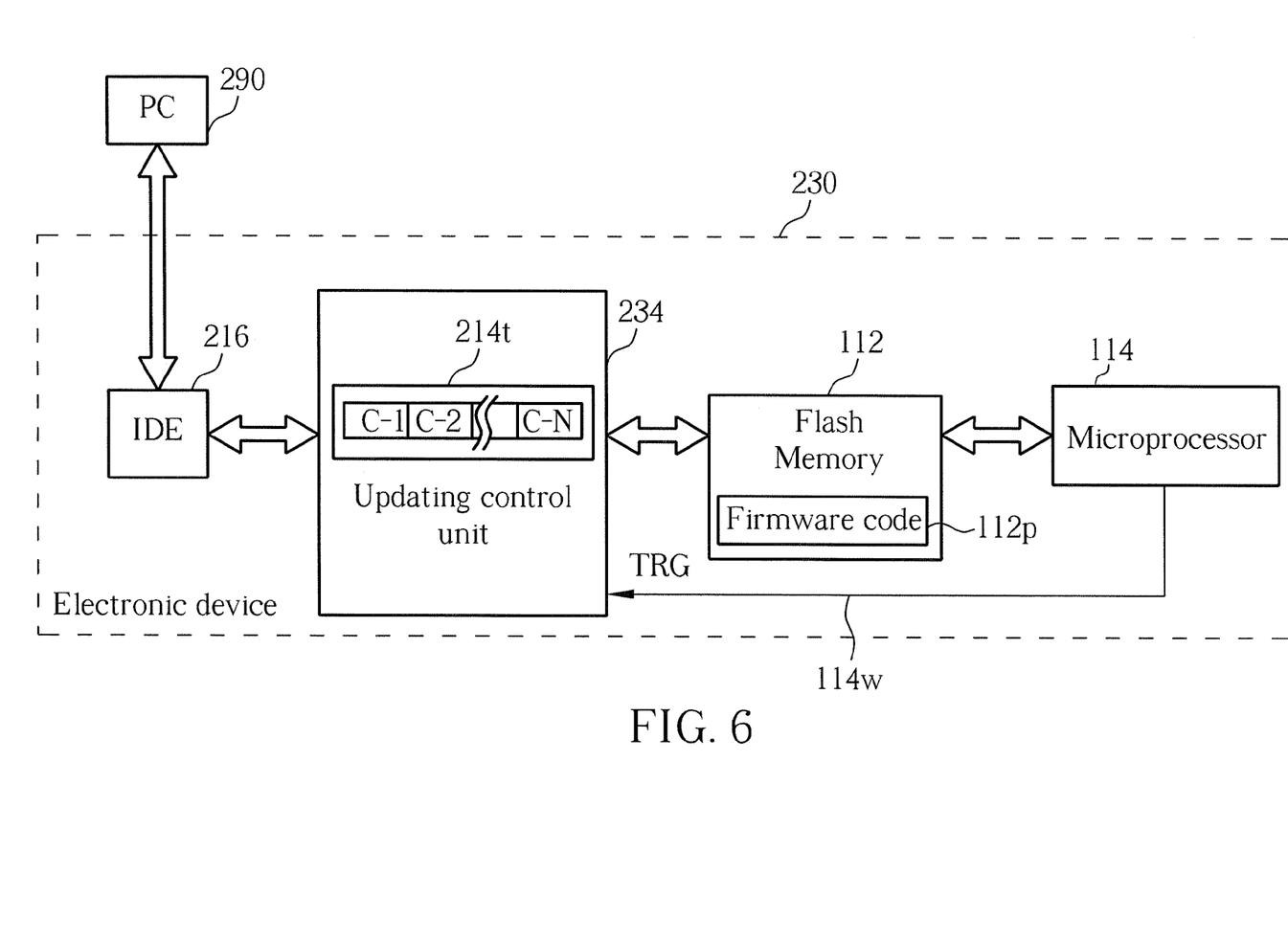
FIG. 6 is a diagram of an electronic device according to a third embodiment of the present invention.

A third embodiment of the present invention is similar to the first embodiment mentioned above. According to the third embodiment shown in FIG. 6, when updating the firmware code 112$p$, the master control device is the microprocessor 114. The trigger signal TRG is generated by the microprocessor 114 and is transmitted through a signal transmission wire 114$w$ to the updating control unit 234 to enable the command C-J.

Figure 7:
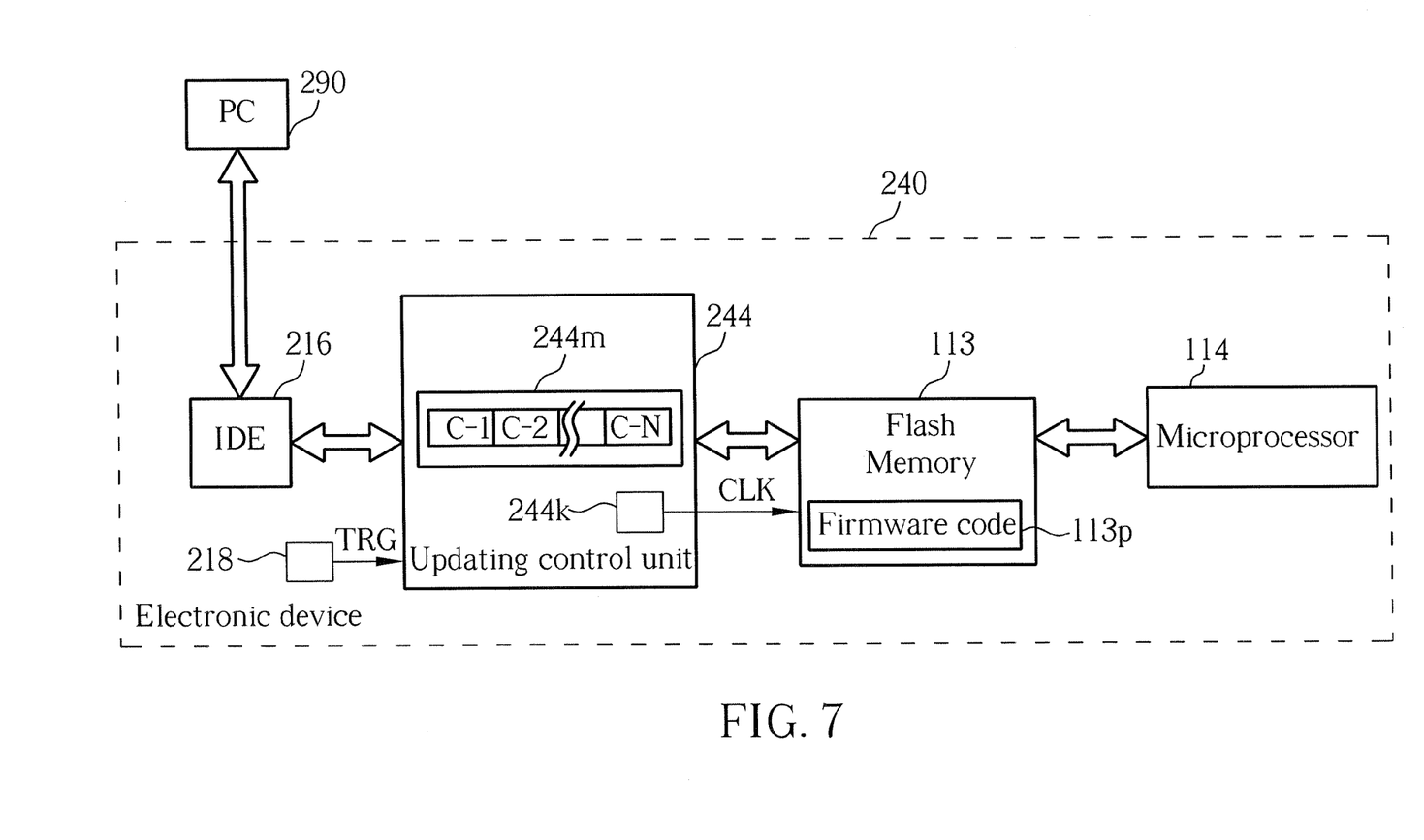
FIG. 7 is a diagram of an electronic device according to a fourth embodiment of the present invention.

A fourth embodiment of the present invention is similar to the first embodiment mentioned above with exceptions described as follows. According to the fourth embodiment shown in FIG. 7, the command set C-1, C-2, ..., C-N is stored in a random access memory (RAM) 244$m$. That is, each command of the command set C-1, C-2, ..., C-N is capable of being updated in real time. According to the fourth embodiment, the electronic device 240 is capable of updating any command C-K (K=1, 2, ..., N) of the command set C-1, C-2, ..., C-N in real time. In addition, the Flash Memory 113 shown in FIG. 7 is a Serial Flash Memory 113, and the electronic device 240 further includes a clock generator 244$k$ for generating a clock signal CLK to control the Serial Flash Memory 113.

Furthermore, the IDE interface 216 is not the only way for the present invention to connect the electronic device 210, 220, 230, or 240 to the computer system 290. According to another embodiment of the present invention, the IDE interface 216 can be replaced with a Universal Serial Bus (USB) interface or a Serial ATA interface.

During the process of updating the firmware code 112$p$ or 113$p$ according to the present invention, it is unnecessary to uninstall/install the non-volatile memory 112 or 113 from/to a circuit board of the electronic device. In addition, according to the present invention, it is unnecessary to prepare a ROM writer 120 for updating the firmware code. When triggered by the trigger signal TRG, the electronic device 210, 220, 230, or 240 starts to update the firmware code. Therefore, updating the firmware code according to the present invention is convenient for the end user.

It is another advantage of the present invention that each command of the command set C-1, C-2, ..., C-N of the updating control unit 214, 224, 234, or 244 is a memory read/write command C-I (I=1, 2, ..., N) that is handy for the electronic device 210, 220, 230, or 240, respectively, to update the firmware code. Therefore, the efficiency of updating the firmware code of a large number of electronic devices is improved. In addition, as each command C-K (K=1, 2, ..., N) of the command set C-1, C-2, ..., C-N is capable of being updated in real time, the present invention method and device are flexible.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for updating a firmware code stored in a non-volatile memory, the non-volatile memory being installed in an electronic device, the method comprising the following steps:

within the electronic device, providing an updating control unit comprising a command set, and providing a microprocessor electrically connected to the non-volatile memory for performing operations of the electronic device according to the firmware code stored in the non-volatile memory;

providing the updating control unit with a trigger signal to enable at least one command of the command set; and utilizing the updating control unit to read/write the non-volatile memory according to the enabled command to update the firmware code;

wherein each command of the command set is a memory read/write command.

2. The method of claim 1, further comprising:

updating at least one command of the command set in real time.

3. The method of claim 2, wherein the command set is stored in a random access memory (RAM).

4. The method of claim 1, wherein within the step of providing the updating control unit with a trigger signal, the trigger signal is generated by a computer system and transmitted through an interface to the updating control unit.

5. The method of claim 4, wherein the interface is an IDE interface, a USB interface, or a Serial ATA interface.

6. The method of claim 4, further comprising:
inputting data outputted by the computer system through the interface using the updating control unit to update the firmware code.

7. The method of claim 1, further comprising:
reading data stored in a computer system through an interface using the updating control unit to update the firmware code.

8. The method of claim 1, wherein the non-volatile memory is a Flash Memory.

9. The method of claim 8, wherein the Flash Memory is a Serial Flash Memory, and the method further comprises:
generating a clock signal using a clock generator installed within the updating control unit to control the Serial Flash Memory.

10. The method of claim 1, wherein the electronic device is an optical storage device.

11. The method of claim 1, wherein the updating control unit and the microprocessor are separate components of the electronic device.

12. The method of claim 1, further comprising generating the trigger signal by a specific button of the electronic device.

13. The method of claim 1, further comprising providing the non-volatile memory with a clock signal that is synchronized with the commands.

14. An electronic device comprising:
a non-volatile memory for storing firmware code;
a microprocessor electrically connected to the non-volatile memory for performing operations of the electronic device according to the firmware code stored in the non-volatile memory; and
an updating control unit electrically connected to the non-volatile memory for updating the firmware code, the updating control unit further comprising a command set, wherein when triggered by a trigger signal, the updating control unit is for reading/writing the non-volatile memory according to the command set to update the firmware code;
wherein the command set includes at least one command, and each command of the command set is a memory read/write command.

15. The electronic device of claim 14, wherein the updating control unit is further for updating a command of the command set in real time.

16. The electronic device of claim 15, wherein the command set is stored in a random access memory (RAM).

17. The electronic device of claim 14, further comprising:
an interface electrically connected to the updating control unit;
wherein the trigger signal is generated by a computer system and transmitted through the interface to the updating control unit.

18. The electronic device of claim 17, wherein the interface is an IDE interface, a USB interface, or a Serial ATA interface.

19. The electronic device of claim 17, wherein the updating control unit is capable of inputting data outputted by the computer system through the interface to update the firmware code.

20. The electronic device of claim 14, further comprising:
an interface electrically connected to the updating control unit;
wherein the updating control unit is capable of reading data stored in a computer system through the interface to update the firmware code.

21. The electronic device of claim 14, wherein the non-volatile memory is a Flash Memory.

22. The electronic device of claim 21, wherein the Flash Memory is a Serial Flash Memory, and the updating control unit further comprises:
a clock generator for generating a clock signal to control the Serial Flash Memory.

23. The electronic device of claim 14, wherein the electronic device is an optical storage device.

24. The electronic device of claim 14, where the updating control unit and the microprocessor are separate components.

25. The electronic device of claim 14, further comprising a specific button, wherein the trigger signal is generated by the specific button.

26. The electronic device of claim 14, wherein the updating control unit further comprises a clock generator for generating a clock signal that is synchronized with the commands.

* * * * *